US011959501B2

(12) United States Patent
Bottacini

(10) Patent No.: US 11,959,501 B2
(45) Date of Patent: Apr. 16, 2024

(54) ACTUATION UNIT OF THE ARTICULATED LEVER OR CAM TYPE PROVIDED WITH A BRAKING UNIT

(71) Applicant: PNEUMAX S.P.A., Milan (IT)

(72) Inventor: Rossella Bottacini, Milan (IT)

(73) Assignee: PNEUMAX S.P.A., Milan (IT)

( * ) Notice: Subject to any disclaimer, the term of this patent is extended or adjusted under 35 U.S.C. 154(b) by 133 days.

(21) Appl. No.: 17/763,325

(22) PCT Filed: Sep. 21, 2020

(86) PCT No.: PCT/IB2020/058771
§ 371 (c)(1),
(2) Date: Mar. 24, 2022

(87) PCT Pub. No.: WO2021/059109
PCT Pub. Date: Apr. 1, 2021

(65) Prior Publication Data
US 2022/0341443 A1 Oct. 27, 2022

(30) Foreign Application Priority Data

Sep. 25, 2019 (IT) .......................... 102019000017168

(51) Int. Cl.
*F15B 15/26* (2006.01)
*F16D 63/00* (2006.01)
*F16D 66/00* (2006.01)

(52) U.S. Cl.
CPC .......... *F15B 15/262* (2013.01); *F16D 63/008* (2013.01); *F16D 66/00* (2013.01); *F16D 2066/003* (2013.01)

(58) Field of Classification Search
CPC ........ F15B 15/262; B60T 17/00; B60T 17/08; F16D 66/00; F16D 63/008
See application file for complete search history.

(56) References Cited

U.S. PATENT DOCUMENTS

2003/0089225 A1* 5/2003 Varetto ................. F15B 15/264
92/140

FOREIGN PATENT DOCUMENTS

DE 3907780 A1 9/1990
DE 4126897 A1 2/1993
(Continued)

OTHER PUBLICATIONS

International Application No. PCT/IB2020/058771, International Search Report and Written Opinion, dated Jan. 22, 2021, 9 pages.

*Primary Examiner* — Kenneth Bomberg
*Assistant Examiner* — Daniel S Collins
(74) *Attorney, Agent, or Firm* — Leber IP Law; Celia H. Leber

(57) ABSTRACT

An actuation unit includes an actuating arm pivotable between an open and closed position; a pneumatic cylinder comprising a stem movable linearly along a cylinder axis and configured to control pivoting of the actuating arm; and a closing device that includes a braking unit configured to brake movement of the actuating arm having a surface portion configured to come into contact with at least one braking assembly. The braking assembly is locked against rotation and axially movable between a non-braking and braking configuration. The surface portion is in a non-orthogonal arrangement with respect to the cylinder axis and the braking assembly includes a plurality of rollers retained in the braking assembly with clearance at least with respect to a radial movement thereof, the rollers being able to assume a first radial configuration not in contact with the surface portion and a second radial configuration in contact with the surface portion.

20 Claims, 8 Drawing Sheets

(56) References Cited

FOREIGN PATENT DOCUMENTS

| | | |
|---|---|---|
| DE | 29720838 U1 | 2/1998 |
| EP | 1300625 A2 | 4/2003 |
| EP | 1777432 A1 | 4/2007 |

* cited by examiner

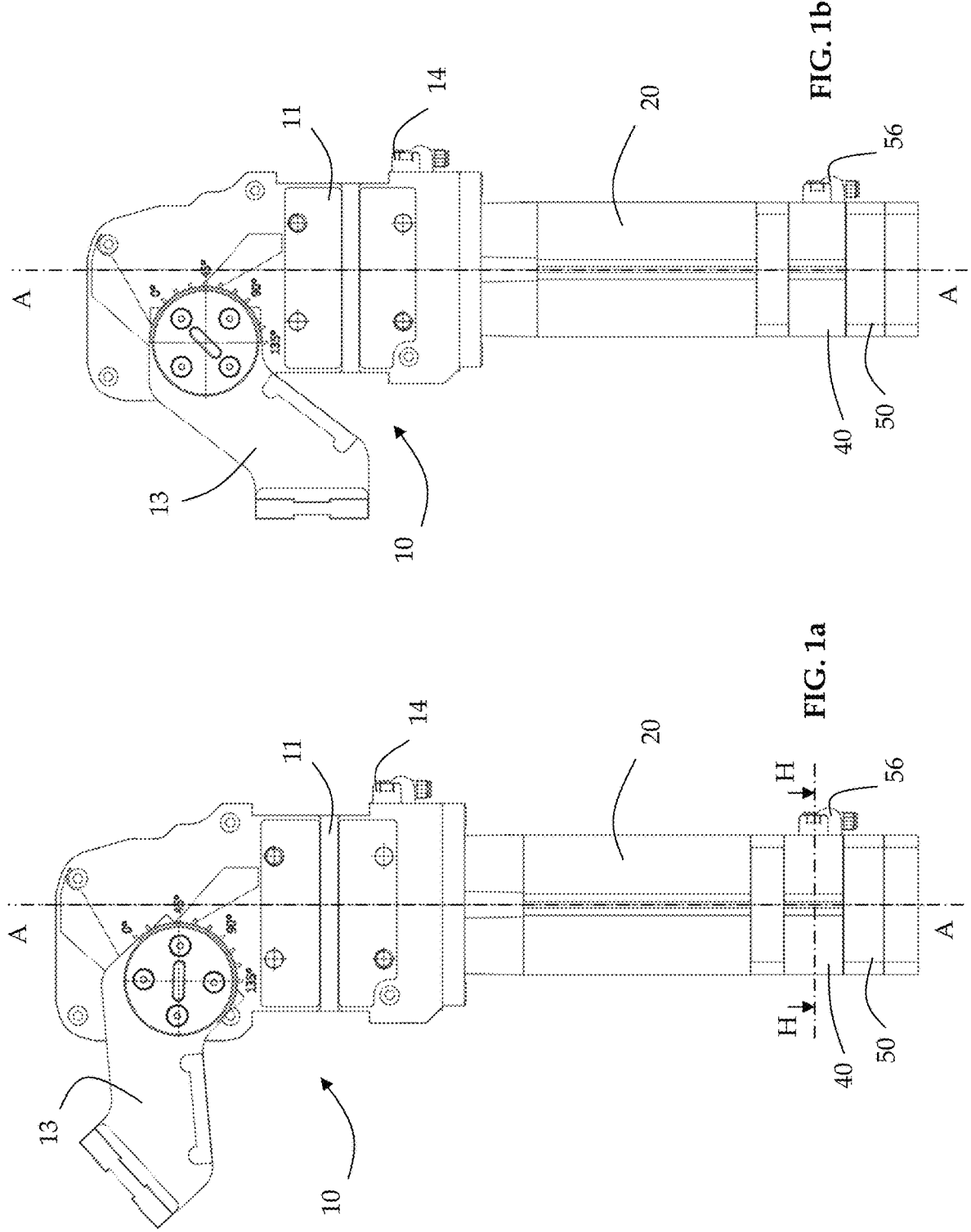

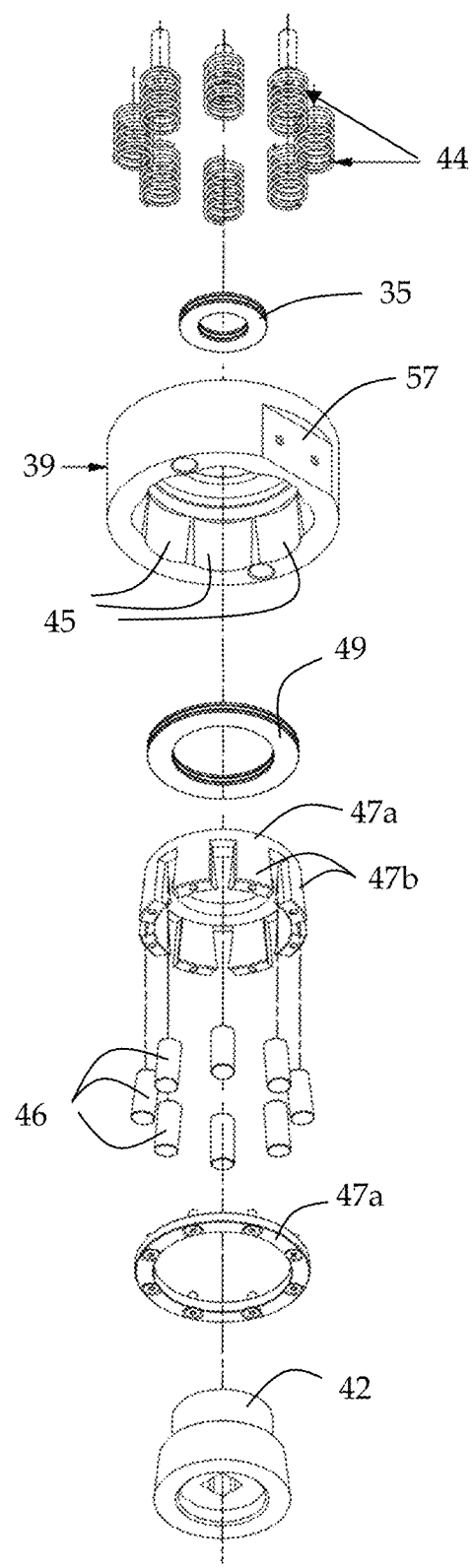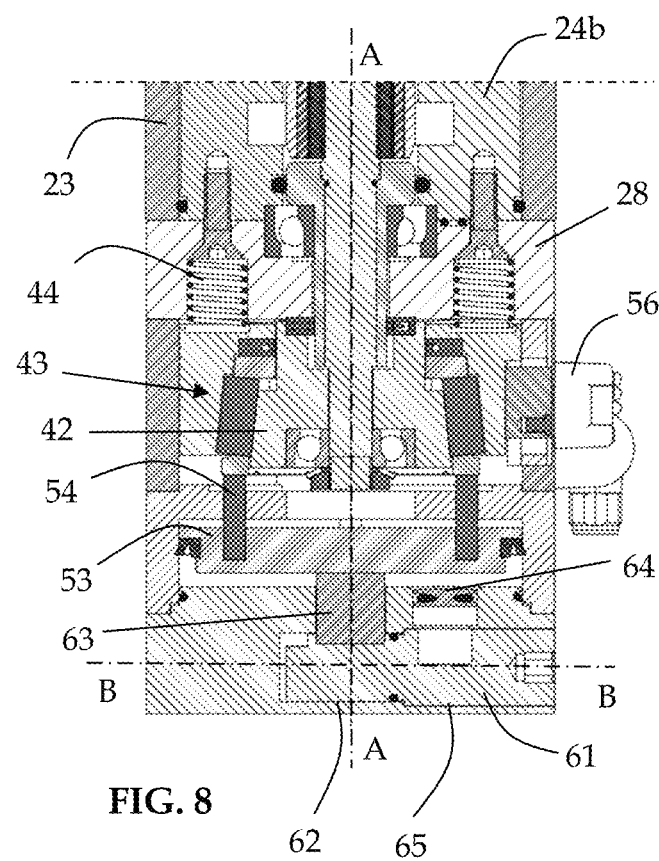
FIG. 5
FIG. 8

US 11,959,501 B2

ACTUATION UNIT OF THE ARTICULATED LEVER OR CAM TYPE PROVIDED WITH A BRAKING UNIT

RELATED APPLICATIONS

This application is a national phase entry of International Patent Application No. PCT/IB2020/058771, filed Sep. 21, 2020, which claims priority from Italian Patent Application No. 102019000017168, filed Sep. 25, 2019.

TECHNICAL FIELD

The present invention generally relates to an actuation unit of the articulated lever or cam type provided with a braking unit configured to ensure the parking of an actuator of the actuation unit in a predetermined position. In particular, the present invention relates to rotating or oscillating units typically used in the field of sheet metal working, for example for the construction of motor vehicle bodies.

BACKGROUND

In the field of the construction of motor vehicle bodies, it is known to use actuation units of the rotating or oscillating type for the movement of a support arm to which the grippers for locking the sheets to be welded are constrained, maintaining the support arm firmly locked in a certain position.

For this purpose, the known actuation units comprise a closing device capable of bringing a support arm connected to this device into an exact closed operative position and, once reached, keeping it in this position, triggering a mechanism of irreversibility able to guarantee the position even in the absence of the actuation command.

In these actuation units, anomalous conditions of the actuation command can occur, due for example to the supply of a pressurized fluid in the case of pneumatic command, which can involve risks both for the integrity of the actuation units themselves and of the equipment transported by them, as well as for the safety of the operators who are near the units.

In the case of pneumatic command the anomaly conditions can be generally attributed to an incorrect connection of the supply or, more often, to a pressure drop in the pressurized fluid supply line. In this second condition, due to the absence of sufficient pressure and under the weight of the equipment constrained to the support arm, the latter can suddenly and violently return to the open position, dragging the equipment therewith.

The use of braking units has been proposed to prevent this dangerous condition, designed to activate automatically in the event of insufficient pressure in the supply line, in order to stop or slow down the movement of the support arm between the open and closed positions resulting from this pressure drop.

An example of an actuation unit of the articulated lever type comprising a braking unit is described in detail in the European patent no. EP 1777432A1.

The actuation unit of EP 1777432A1 comprises a body with which a pneumatically actuated cylinder is associated which acts on a locking device of the articulated lever or toggle type. In detail, the stem of the cylinder is pivotably constrained to one end of a connecting rod, constrained at the other end to a crank, also in this case in a rotatable manner. The crank is also provided with a pair of coaxial pins which protrude from the body of the unit and to which at least one actuator arm is connected in an integral manner, which is therefore brought into rotation by the movement of the crank.

A plunger mounted slidingly and sealingly in a chamber defined inside the body of the cylinder and delimited by two heads arranged respectively at the axial ends of the cylinder is inferiorly connected to the stem of the cylinder. At the opposite face of the plunger with respect to the face connected to the stem of the cylinder, the plunger is connected to a sleeve which has a cavity coaxial with the stem, in which it engages a threaded shaft of a braking unit. The coupling of the threaded shaft in the cavity of the sleeve is such that the shaft can rotate about its own axis following the reciprocating movement of the plunger. In this way, by braking the rotation of the shaft, a braking of the reciprocating movement of the plunger and, consequently, of the elements connected thereto is attained.

In order to brake the rotation of the shaft, the braking unit described in EP 1777432A1 comprises a disc brake which acts on a disc element connected to an end of the shaft. The disc brake comprises two brake discs, one of which is movable, on which elastic elements act to bring and maintain the brake discs against the disc element of the shaft, thereby exerting a braking action. In order to release the braking action, the assembly consisting of the disc element and the two brake discs is housed in a sealed chamber which is pneumatically supplied in such a way as to counteract the action of the elastic elements. In this way, in the event of a drop or absence of pressure on the supply line or in the event of a drop or absence of voltage, for example on the valves of the supply circuit, the force to counteract the action of the elastic elements ceases, hence the spontaneous braking action of the braking unit taking over.

Similarly, document EP 1 300 625 A1 describes an actuation unit of the articulated lever type comprising a braking unit, it being also provided with a shaft coupled to the plunger of the actuation cylinder in such a way that the shaft can rotate about its own axis following the reciprocating movement of the plunger.

In this case, however, a head portion is mounted at the free end of the shaft which head portion cooperates with an auxiliary floating plunger, shaped like a glass, both housed in a sealed chamber pneumatically supplied through the same source that controls the actuation cylinder. The opposed surfaces of the head portion and the auxiliary plunger are provided with corresponding mutual engagement formations. The auxiliary plunger is urged by elastic thrust means towards the head portion. Said thrust action is counteracted by the pressure that is created in the sealed chamber thanks to the pneumatic supply, so as to keep the plunger spaced from the head portion by a distance of a few millimetres. In the event of a drop or absence of pressure on the supply line, the force counteracting the action of the elastic elements ceases, hence the spontaneous braking action of the braking unit taking over.

The Applicant has pointed out that the braking units used in known actuation units have the disadvantage of strong wear due to the friction between the circular or disc surfaces that come into contact with the head of the shaft to stop the rotation thereof.

The Applicant has also observed that, in order to have an effective braking action, it is necessary to size the diameter of the braking elements according to the size of the pneumatic cylinders, obtaining braking units having increasingly important radial overall dimensions as the size of the cylinders increases. So, making a universal brake, usable with all the cylinder sizes usually used in the actuation units and at the same time maintaining the radial dimensions of the actuation units is made impossible.

The Applicant has also pointed out that the known solutions do not generally provide for the possibility of excluding the braking unit—a case that is useful for example during the installation step when the connection to the supply is not yet active—or, if the exclusion is envisaged, an automatic recovery thereof.

The Applicant has therefore perceived the need to realise braking units for linear actuation units or of the articulated lever type capable of exerting a high braking action, regardless of the radial overall dimensions of the unit and less subject to wear than those known in the current state of the art.

The Applicant has also perceived the need to devise braking units for linear actuation units or of the articulated lever type capable of being deactivated manually in order to be able to easily solve emergency situations and/or to facilitate the installation of the actuation, for example prior to connection to the supply source.

OBJECTS AND SUMMARY OF THE INVENTION

In light of the above, the problem underlying the present invention is that of devising an actuation unit capable of overcoming the drawbacks of the prior art.

Within this problem, an object of the present invention is that of realising a linear actuation unit or of the articulated lever type provided with a compact and reliable braking unit.

Another object of the present invention is that of realising a linear actuation unit or of the articulated lever type provided with a braking unit which is subject to reduced wear and can be easily deactivated in case of need in addition to providing an automatic recovery.

In accordance with a first aspect thereof, the invention therefore concerns an actuation unit of the articulated lever or cam type comprising an actuating arm pivotable between an open position and an operative closed position; a pneumatic cylinder comprising a stem movable linearly along a cylinder axis and operatively connected to the actuating arm to control the movement of the actuating arm between the open position and the operative closed position; a closing device functionally interposed between the pneumatic cylinder and the actuating arm and configured to bring the actuating arm into rotation following a translational movement imparted by the pneumatic cylinder, wherein the closing device comprises a mechanism of irreversibility of movement configured to trigger when the actuating arm reaches the operative closed position; and a braking unit configured to brake and/or stop the movement of the actuating arm, the braking unit comprising a threaded shaft comprising a first end operatively coupled to the stem of the pneumatic cylinder in such a way that a translation of the stem determines a rotation of the threaded shaft, and a second end provided with a head portion comprising at least one surface portion configured to come into contact with at least one braking assembly; and a braking assembly locked against rotation and axially movable relative to the head portion of the threaded shaft between a first non-braking configuration in which the braking assembly is not in contact with the at least one surface portion of the head portion and a second braking configuration in which the braking assembly is in contact with the at least one surface portion of the head portion.

According to the present invention, the at least one surface portion of the head portion configured to come into contact with the braking assembly is arranged according to an orientation which is not orthogonal to the axis of the cylinder. Furthermore, the braking assembly comprises a plurality of rollers retained in the braking assembly with clearance at least with respect to a radial movement. The rollers of the plurality of rollers can thus assume a first radial configuration not in contact with the at least one surface portion of the head portion and a second radial configuration in contact with the at least one surface portion of the head portion.

The Applicant has identified that thanks to the particular geometry and arrangement of the surfaces which, interacting with each other, offer the braking action, it is possible to obtain an effective and reliable braking action while maintaining very limited radial overall dimensions. The braking surfaces in fact develop not orthogonally to the axis of the cylinder, thus presenting a surface with a not exclusively radial development. With the same radial extension it is therefore possible to realise much wider braking surfaces, thus optimizing the braking action with respect to the radial extension of the braking unit.

Furthermore, the use of rollers housed in the braking assembly with clearance along the radial direction allows to enhance the braking action, making the rollers assume a radial configuration of greater friction against the head portion configured to come into contact with the braking assembly.

The present invention may have at least one of the preferred following features; the latter may in particular be combined with one another as desired in order to meet specific application needs.

In a variant of the invention, the at least one surface portion of the head portion configured to come into contact with the braking assembly is at least a portion of cone frustum surface having axis coincident to the cylinder axis and total angle of the cone frustum less than or equal to 30° like for example comprised between 1° and 30°, preferably comprised between 1° and 20°, more preferably between 1° and 15°.

Thanks to the particular shape of the head portion configured to interact with the braking assembly, it is possible to obtain a very high braking action in extremely reduced radial dimensions. In particular, the cone frustum shape also allows to obtain a deactivation of the brake, once it has to be released, through a minimum relative axial movement between the head portion and the braking assembly.

In a variant of the invention, the at least one surface portion of the head portion configured to come into contact with the braking assembly is at least one portion of cylindrical surface with axis parallel to the cylinder axis.

Advantageously, the particular shape of the head portion configured to interact with the braking assembly allows to maintain the radial overall dimensions of the braking unit to a minimum.

In a variant of the invention, the braking assembly defines a braking seat configured to at least partially receive inside the head portion, the braking seat having a shape substantially complementary to at least part of the head portion.

In particular, the braking seat configured to receive at least part of the head portion is delimited at least in part by the plurality of rollers.

Advantageously, the presence of a braking seat defined in the braking assembly and in which it is possible to insert the head portion makes it possible to exploit a large part of the perimeter surface of the head portion in order to exert the braking action and at the same time to maintain the overall dimensions of the braking unit to a minimum.

In a variant of the invention, the braking assembly comprises a cup-shaped element which internally defines a housing provided with a lateral inner wall, a plurality of locking seats being obtained in the lateral inner wall, in each locking seat a respective roller being engaged by a respective roller of the plurality of rollers with clearance with respect to an angular movement thereof.

In a variant of the invention, the braking assembly comprises a support structure for the rollers, preferably a cage-shaped structure, configured to retain each roller of the plurality of rollers in such a way as to allow clearance with respect to a radial movement of the rollers.

Preferably, the support structure for the rollers is configured to retain each roller of the plurality of rollers in the respective locking seat.

Advantageously, the particular construction of the braking seat in which the head portion can be inserted in order to exert the braking action allows to obtain a configuration on the one hand that is particularly reliable in terms of braking action, in fact the rollers displacing angularly and radially position themselves in such a way as to be locked against rotation and pushed radially towards the head portion and therefore to exert an increased friction action thereon. On the other hand, the possibility of radial and angular clearance guarantees the prevention of locking situations of the head portion inside the braking seat.

Preferably, each locking seat of the plurality of locking seats is obtained as a recess in the lateral inner wall of the housing defined by cup-shaped element and in the form of a portion of a conical surface.

More preferably, the locking seats extend between a bottom wall and an inlet mouth of the housing defined by the cup-shaped element, with an inclination by an angle α with respect to the axis and oriented in such a way that their lengthening would intersect the axis.

Preferably, the support structure for the rollers defines a plurality of receptacles flared in the radial direction, each roll being housed with clearance in a receptacle.

Preferably, the support structure comprises a pair of discs connected by a plurality of columns, wherein the columns have a cross section shaped in such a way as to define a receptacle flared in a radial direction.

More preferably, a space defined by a locking seat and a receptacle is configured in such a way as to allow a roller engaging said space a limited angular and radial displacement.

In a variant of the invention, at least one elastic element and a second pneumatically actuated cylinder act axially along the cylinder axis on the brake assembly one against the other, the at least one elastic element producing a relative approaching movement between the braking assembly and the head portion, the second pneumatically actuated cylinder producing a relative movement away between the braking assembly and the head portion.

Preferably, the second pneumatically operated cylinder is configured to axially move a plurality of pushers arranged in such a way as to transfer an axial thrust to the braking assembly opposed to the at least one elastic element.

Preferably, the actuation unit comprises a deactivation unit configured to transfer a manual actuation to the second pneumatically actuated cylinder.

Preferably, the deactivation unit comprises a rotatable element about a rotation axis B orthogonal to the cylinder axis A comprising a cam portion configured to cooperate with a deactivation pin, wherein the rotation of the rotatable element about its own rotation axis B causes a lifting of the deactivation pin.

More preferably, the deactivation unit comprises a recovery piston which cooperates with a second cam portion provided on the rotatable element in such a way that a rotation of the rotatable element about its own rotation axis causes a lifting parallel to the cylinder axis A of the recovery piston and a movement of the recovery piston towards the rotatable element parallel to the cylinder axis A causes a counter-rotation of the rotatable element such as to cause a lowering of the deactivation pin.

In a variant of the invention, the actuation unit comprises at least one position sensor, preferably of the inductive type, configured to detect an instantaneous position of the braking assembly.

Preferably, the cup-shaped element of the braking assembly comprises a receptacle on the perimeter at which at least one activation element is mounted and configured to be detected when arranged at a detection position.

Preferably, the position sensor is mounted on a body of the braking unit at least one window, preferably sealed through a cover made of non-conductive material.

BRIEF DESCRIPTION OF THE DRAWINGS

Further characteristics and advantages of the present invention will be more evident from the following description of some preferred embodiments thereof made with reference to the appended drawings.

The different features in the individual configurations can be combined with each other as preferred according to the previous description, should it be necessary to avail of the advantages resulting specifically from a particular combination.

Figure 2A:
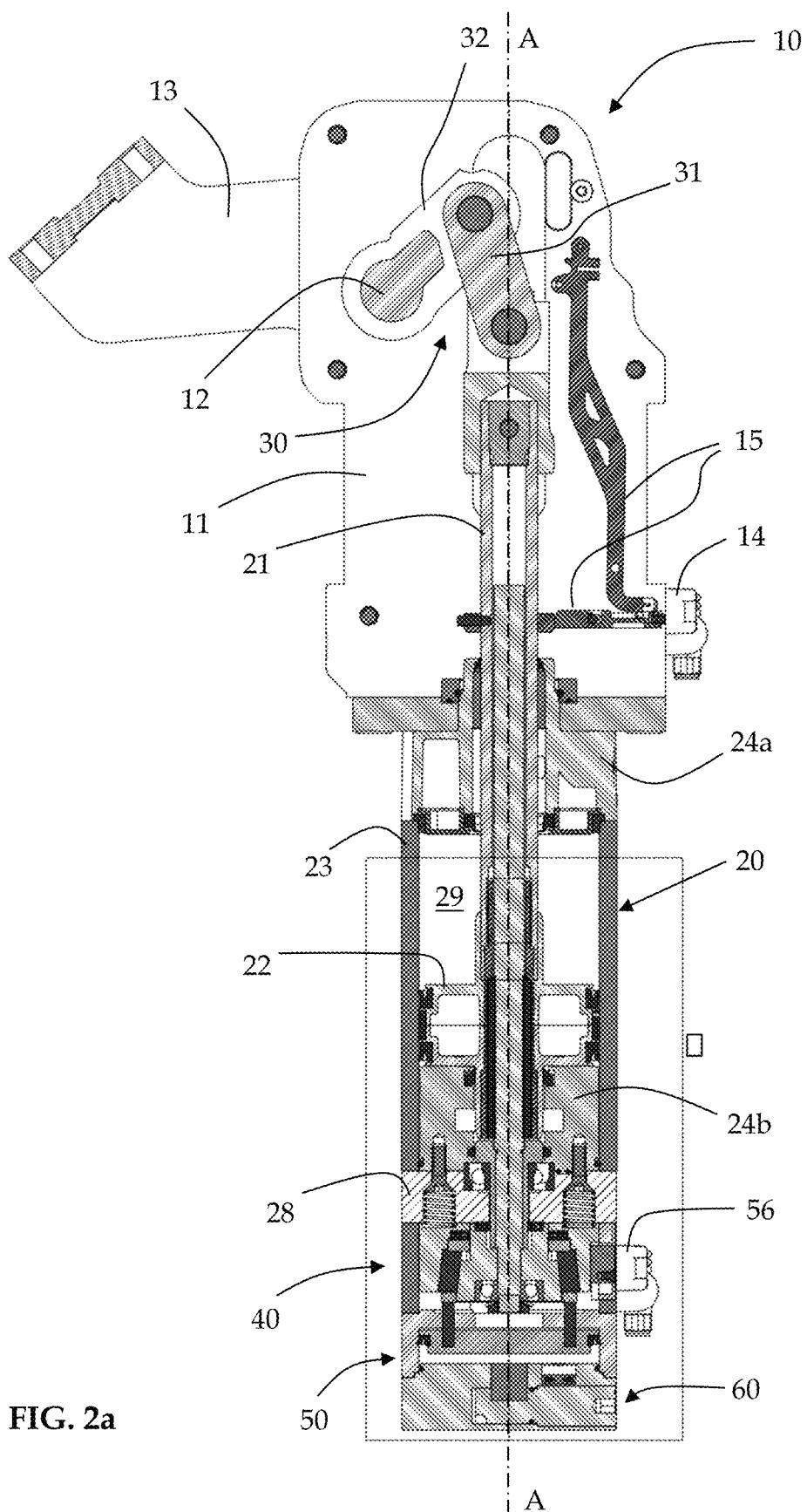
Figure 2B:
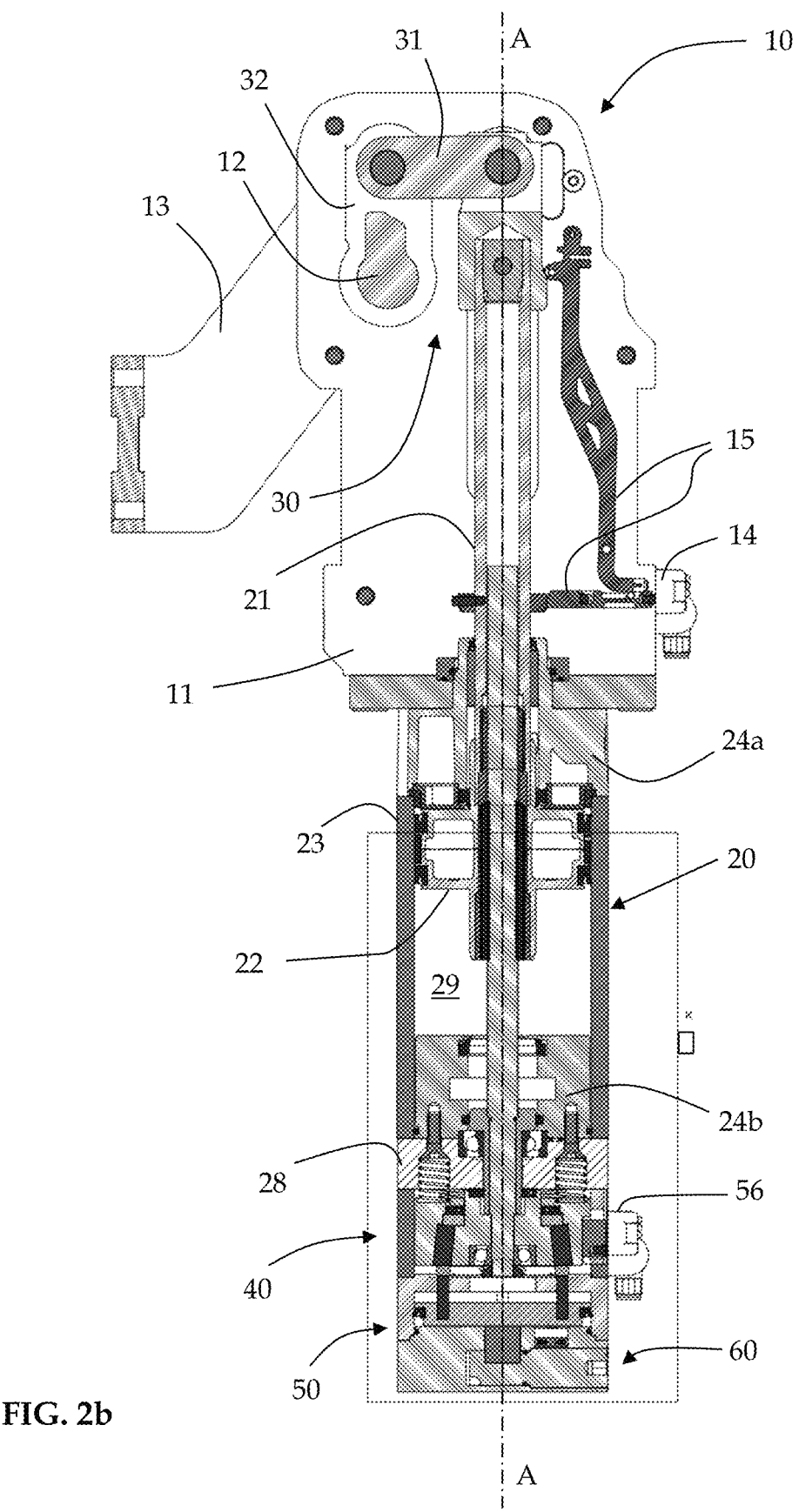
Figure 3A:
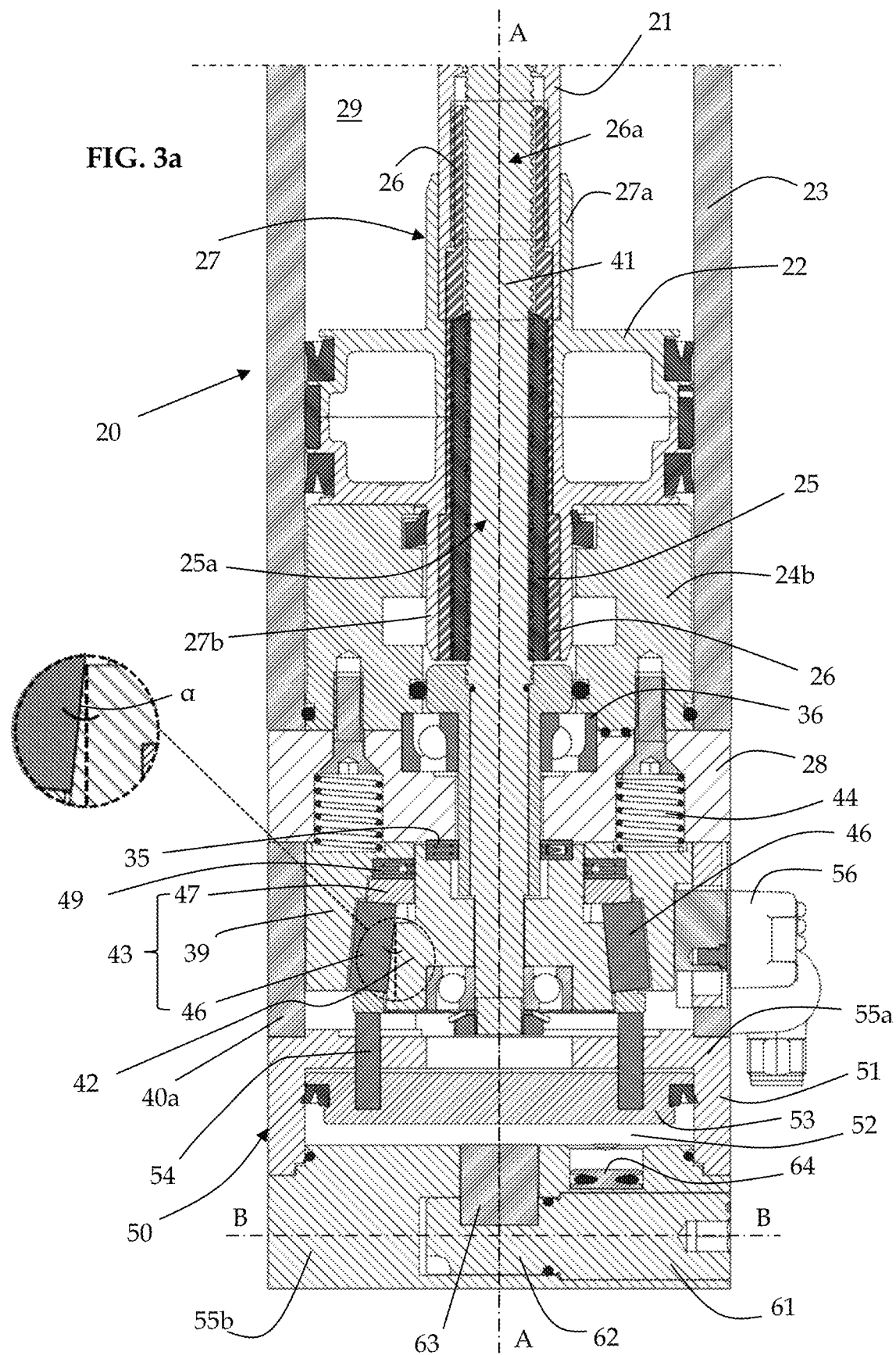
Figure 3B:
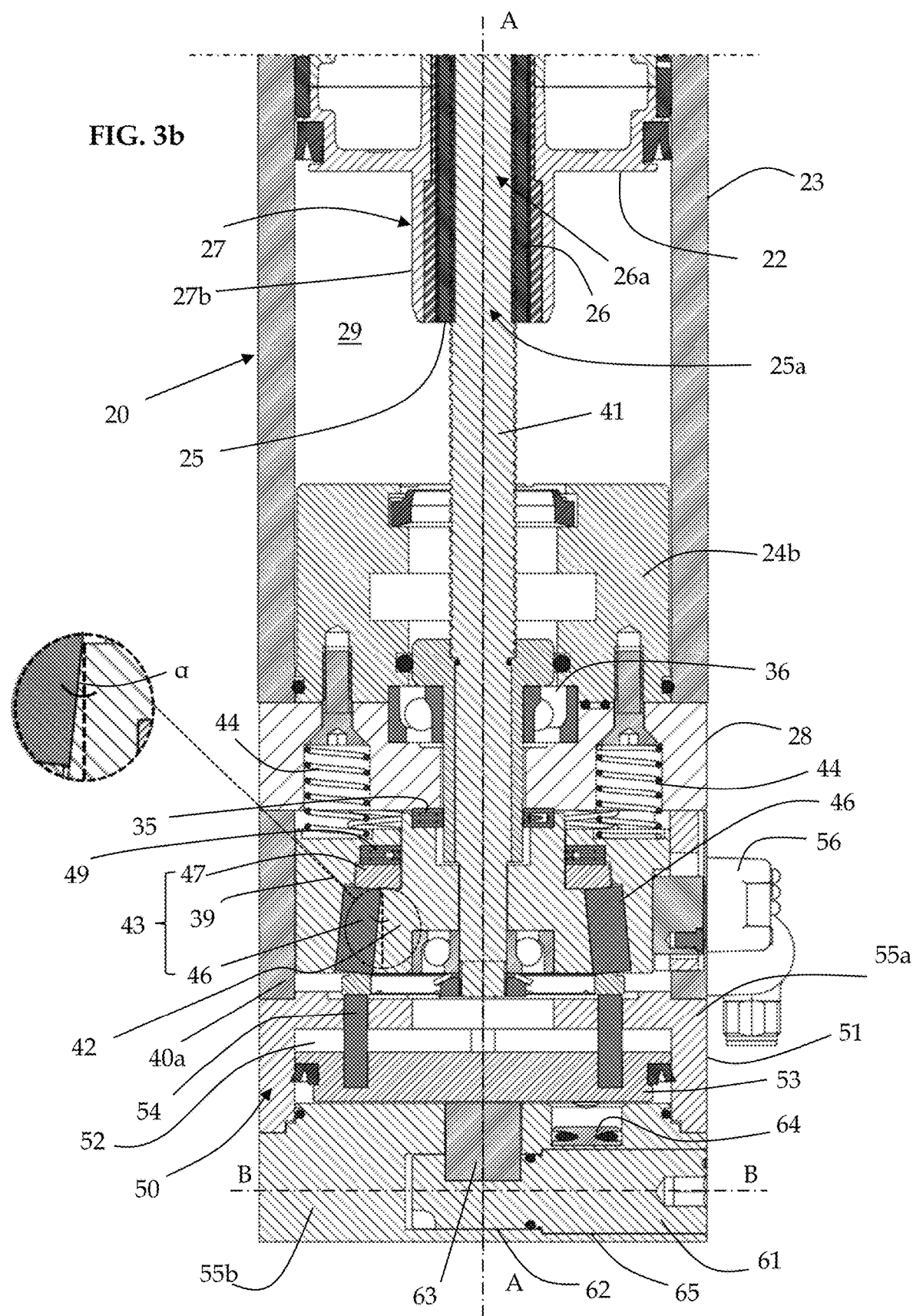
Figure 4:
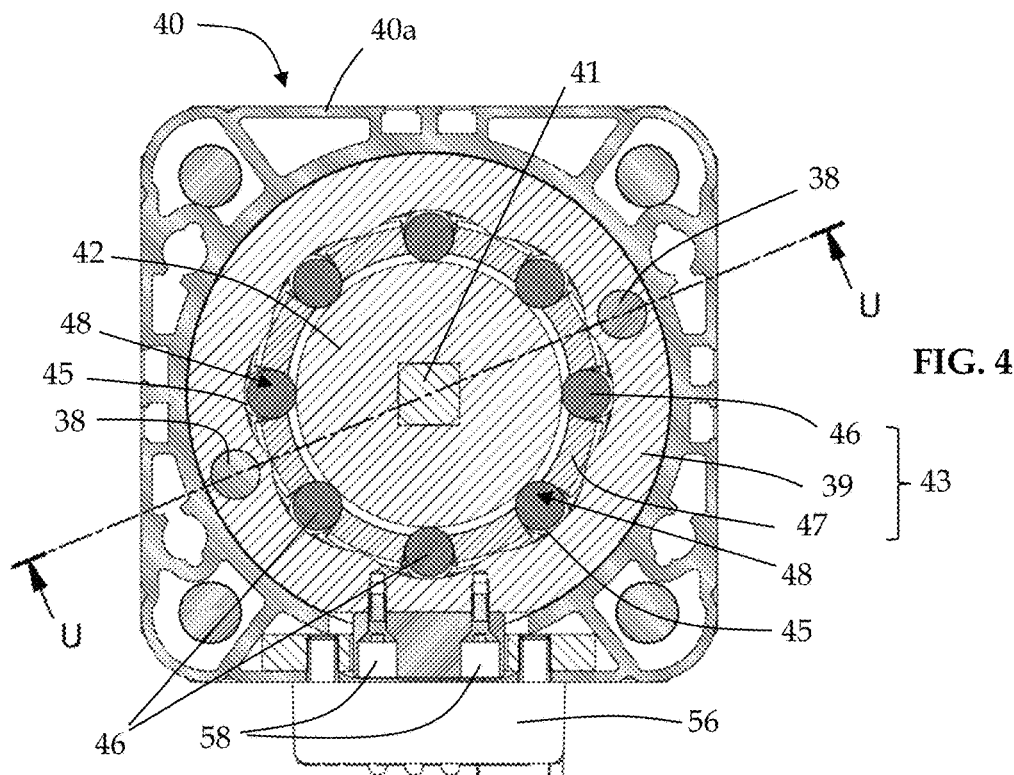
Figure 4A:
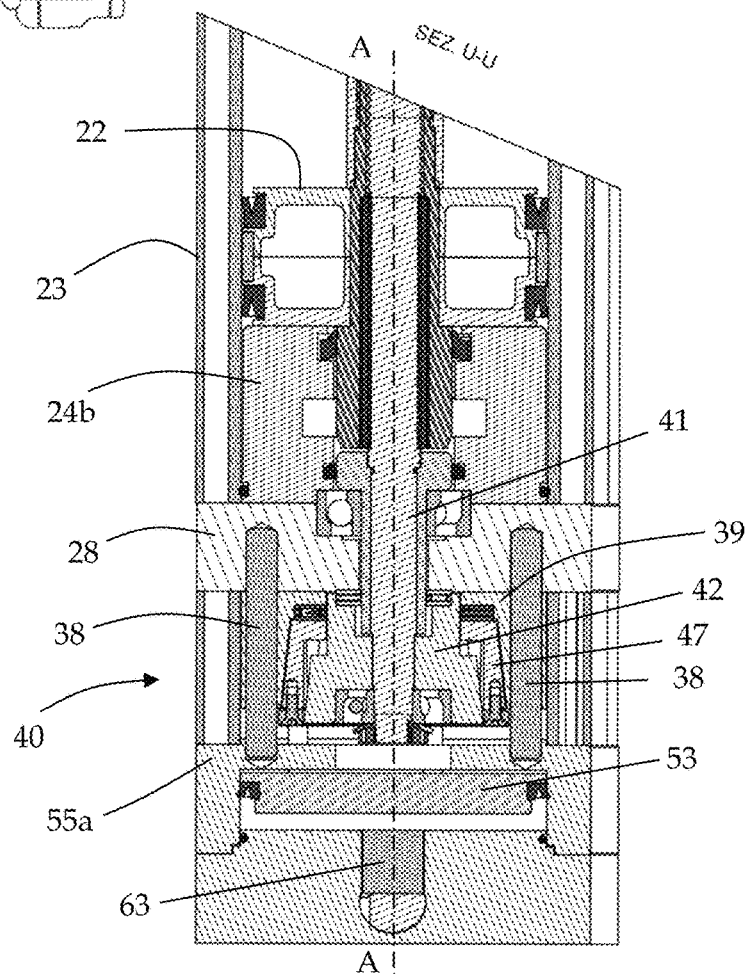
Figure 6:
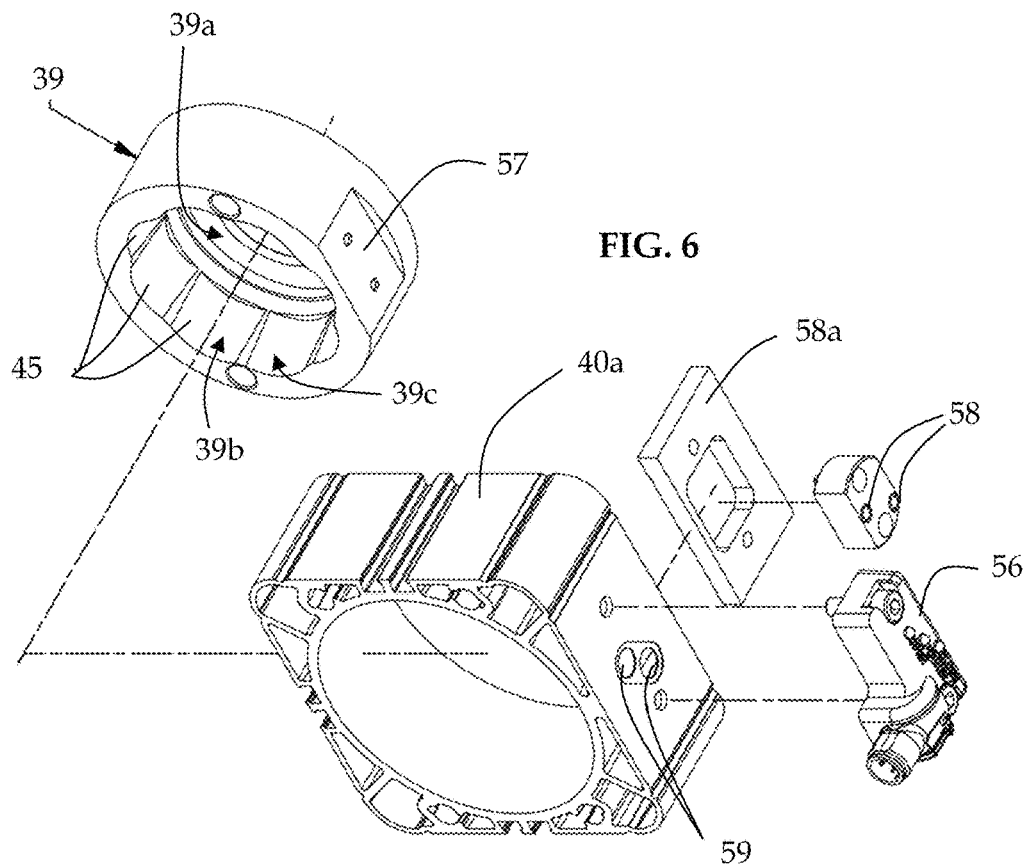
Figure 7:
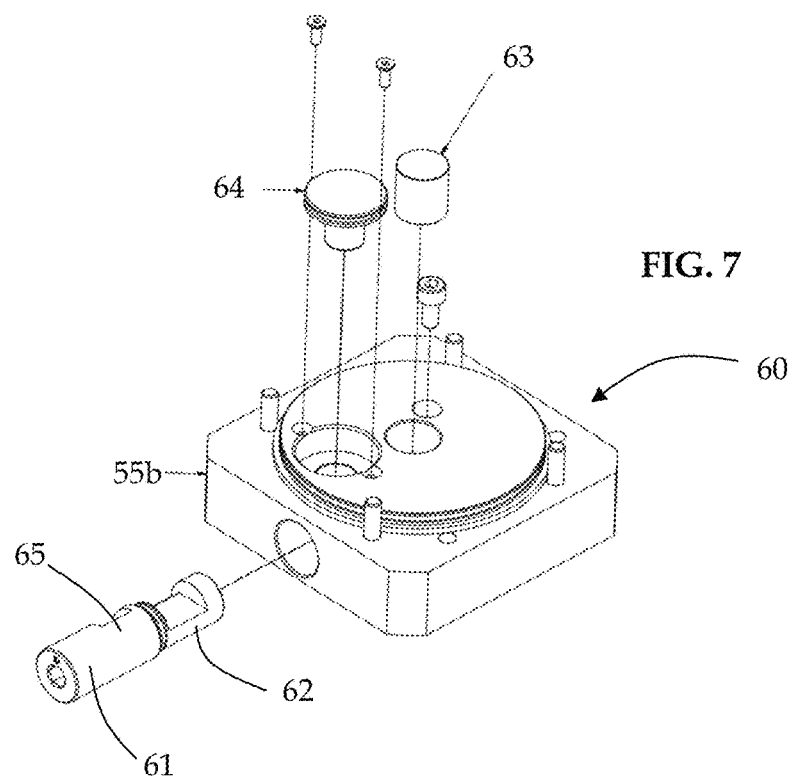

In such drawings,

FIGS. 1a and 1b are side elevation views of a preferred embodiment of the actuation unit according to the invention, specifically a rotating unit, respectively in the partially open configuration and in the closed configuration with triggered mechanism of irreversibility;

FIGS. 2a and 2b are sectional views of the actuation unit of FIG. 1a and FIG. 1b, respectively;

FIGS. 3a and 3b are enlarged details of the sectional views of FIGS. 2a and 2b, respectively;

FIG. 4 is a sectional view along the line H-H of FIG. 1a;

FIG. 4a is a sectional view along the line U-U of FIG. 4;

FIG. 5 is a first partial exploded perspective view of the braking unit of the actuation unit according to the present invention;

FIG. 6 is a second partial exploded perspective view of the braking unit of the actuation unit according to the present invention;

FIG. 7 is an exploded perspective view of the deactivation unit cooperating with the braking unit of the actuation unit according to the present invention;

FIG. 8 is a sectional view of the actuation unit according to the invention with the deactivation unit activated.

DETAILED DESCRIPTION OF THE INVENTION

In the following description, for the illustration of the figures, identical numbers or reference symbols are used to indicate construction elements with the same function. Further, for illustration clarity, some references may not be repeated in all the figures.

While the invention is susceptible to various modifications and alternative constructions, certain preferred embodiments are shown in the drawings and are described hereinbelow in detail. However, it is to be understood that there is no intention to limit the invention to the specific embodiment illustrated but, on the contrary, the invention intends to cover all the modifications, alternative and equivalent constructions that fall within the context of the invention as defined in the claims.

The use of "for example", "etc.", "or" indicates non-exclusive alternatives without limitation, unless otherwise indicated. The use of "comprises" and "includes" means "comprises or includes, but not limited to", unless otherwise indicated.

With reference to FIGS. 1a and 1b, a preferred embodiment of an actuation unit with articulated lever according to the present invention, indicated as a whole with 10, specifically made in the form of a rotating unit is illustrated.

The rotating unit 10 comprises a body 11 inside which a closing device 30 of the articulated lever or toggle type is housed (shown in FIGS. 2a and 2b), movable between a first operative open position and a second operative closed position (illustrated in FIG. 1b).

The rotating unit 10 of FIGS. 1a and 1b also comprises a first pneumatically actuated cylinder 20 having a cylinder axis A, connected locked against the body 11 and provided with an axial stem 21 movable between two end positions and through which the cylinder 20 acts on the closing device 30 inside the body 11 to move it between the first and second operative positions, respectively corresponding to the end positions between which the stem 21 of the cylinder 20 is movable.

In detail, as shown in FIGS. 2a and 2b, the closing device 30 comprises a connecting rod 31 and a crank 32 connected to each other in a pivotable manner substantially at a respective end. The stem 21 of the cylinder 20 is pivotably constrained to another end of the connecting rod 31 of the closing device 30.

The crank 32 is constrained to another own end in a pivotable manner to the body 11 of the actuation unit 10 and is provided with a pair of coaxial pins 12 which protrude from opposed sides of said body 11 of the actuation unit 10. At least one actuating arm 13 is integrally constrained to the coaxial pins 12 and is therefore brought into rotation by the movement of the crank 32. Means for detecting the position 14 and a set of levers 15 which cooperate in a per se known manner with the stem 21 of the cylinder 20 to signal that the end positions that delimit the stroke of the stem 21 has been reached and therefore the first or second operative position of the closing device 30 have been reached, are provided.

The rotating unit 10 of FIG. 1 also comprises a braking unit 40, illustrated in more detail in FIGS. 3-7, configured to brake and stop the movement of the stem 21 and, consequently, of the closing device 30.

As shown in detail in FIGS. 2a and 2b, the first pneumatically actuated cylinder 20 comprises a first cylinder body 23 which internally defines a first sealed chamber 29 delimited by two first heads 24a, 24b arranged respectively at the axial ends of the cylinder body 23. A first upper head 24a is sealingly crossed by the stem 21 of the cylinder 20 which therefore protrudes beyond it, extending with a first end along the cylinder axis A and up to the connecting rod 31. A first lower head 24b is constrained to a closing plate 28 of the cylinder and configured for the entry of the supply therein, which supply is channeled into the first lower head 24b (in short, "closing and supply plate 28").

At a second end thereof housed inside the chamber 29 defined by the cylinder body 23, the stem 21 is constrained to a first plunger 22 mounted axially sliding and sealingly inside said chamber 29.

As better represented in FIGS. 3a and 3b, the plunger 22 of the first cylinder 20 centrally comprises an elongated fitting 27 which defines a through hole in which the second end of the stem 21 is partially housed. The fitting 27 comprises a first annular wall 27a protruding from a first face of the first plunger 22 transversal to the axis of the cylinder A and a second annular wall 27b protruding from a second face of the plunger 22, opposite the first one 27a, transversal to the axis of the cylinder A. The second end of the stem 21 is integrally constrained to the first annular wall 27a of the fitting 27 of the plunger 22.

Inside the fitting 27 there is also provided a support insert 26 which extends partially also inside the stem 21, defining a first axial cavity 26a. For this purpose, the stem 21 is internally hollow. A sleeve 25 is housed in the axial cavity defined internally of the insert 26 which sleeve in turn has a second cavity 25a coaxial to the stem 21. In alternative embodiments, the insert 26 and the sleeve 25 can be made as one piece.

The second cavity 25a defined by the sleeve 25 is internally threaded and engages a threaded shaft 41 belonging to the braking unit 40. The coupling of the threaded shaft 41 in the cavity 25a of the sleeve 25 is such that the shaft 41 can rotate about its own axis following the reciprocating movement of the plunger 22, however remaining axially fixed.

The braking unit 40 therefore comprises the shaft 41 which is arranged along the axis of the cylinder A inside a body 40a of the braking unit 40. The shaft 41 has a first threaded end 41a which is the one which engages in the cavity 25a of the sleeve 25 and a second free end 41b, at which a cone frustum head portion 42 is mounted.

The head portion 42 is constrained to the closing and supply plate 28 of the first pneumatically actuated cylinder 20 in such a way as to be fixed with respect to axial translations and free to rotate about the axis of the cylinder A. To this end, preferably at least one thrust bearing element 35 is provided between the head portion 42 and the plate 28, while the shaft 41 is mounted to the closing and supply plate 28 through the interposition of a bearing element 36 which allows a relative rotation thereof. As an alternative to the thrust bearing element 35 it is possible to provide for a second bearing element (not illustrated) mounted about the shaft 41 and arranged between the head portion 42 and the plate 28.

The head portion 42 cooperates with a floating but rotationally locked braking assembly 43 which defines a braking seat with a shape substantially complementary to the shape of the head portion 42 of the shaft.

The braking assembly 43 is axially movable between a first non-braking configuration, in which the head portion 42 does not appear to have assumed a configuration of maximum insertion inside the braking seat and a second braking configuration in which the head portion 42 appears to have assumed the configuration of maximum insertion inside the braking seat.

Elastic means 44 act axially on the braking assembly 43 of the braking unit 40 to bring the braking assembly 43 into the braking configuration, i.e. from the configuration in which the head portion 42 of the shaft 41 is in a condition of maximum insertion inside of the braking seat. The elastic means 44 are conveniently mounted between the closing and supply plate 28 of the first pneumatically actuated cylinder 20 and the braking assembly 43.

The action exerted by the elastic means 44 on the braking assembly 43 is counteracted by the action of a second pneumatically actuated cylinder 50 with a size smaller than the first one 20, which comprises a second cylinder body 51 inside which a second sealed chamber 52 is defined delimited by a pair of second heads 55a, 55b comprising a second upper head 55a facing the body 11 of the actuation unit 10 and a second lower head 55b opposed the upper one 55a.

In the second sealed chamber 52 a second sealed plunger 53 is housed in an axially sliding manner (illustrated in FIGS. 2a and 3a in its maximum lifting position and in FIGS. 2b and 3b in its fully lowered position). The second plunger 53 carries a series of pushers 54 which are moved axially through the movement of the second plunger 53 itself. The pushers 54 cross the second upper head 55a and are arranged angularly spaced one another in such a way as to delineate a circumference and act on one face of the braking assembly 43 orthogonal to the axis A, substantially at the perimeter of the same.

In the presence of supply, the plunger 53 of the second pneumatically actuated cylinder 50 counteracts the thrust action of the elastic elements 44 in such a way as to maintain the braking assembly 43 spaced from the head portion 42 of the shaft 41, so that head portion does not assume the configuration of maximum insertion inside the braking seat of the braking assembly 43 (FIGS. 2a and 3a).

In the event of a drop or absence of pressure on the supply line, the counteracting force exerted by the second pneumatically actuated cylinder 50 with respect to the axial thrust action exerted by the elastic elements 44 ceases, hence the spontaneous braking action of the braking unit 40 takes over which is obtained by the interaction between the braking assembly 43 and the head portion 42 of the shaft 41, when the braking assembly 43 is brought by the elastic means 44 to contain a maximum part of the head portion 42, so that the latter assumes the configuration of maximum insertion into the braking seat of the braking assembly 43 (FIGS. 2b and 3b).

As illustrated in detail in FIG. 6, in the preferred embodiment the braking assembly 43 comprises a plurality of rollers 46 retained in the braking assembly 43 with clearance both with respect to an angular movement and with respect to a radial movement in such a way that the rollers 46 can assume a first radial configuration not in contact with the head portion 42 and a second radial configuration in contact with the head portion 42, wherein in the second radial configuration in contact, the rollers 46 increase the braking action on the portion of head 42.

For retaining the rollers 46 there is a cup-shaped element 39 mounted to the body 40a of the braking unit 40 locked against rotation using at least one pair of centring pins 38 (shown in FIGS. 4 and 4a) which engage the cup-shaped element 39 and extend between the closing and supply plate 28 and the second upper head 55a, engaging also in these elements (see FIG. 4a).

The cup-shaped element 39 centrally defines a housing with a substantially cone frustum shape comprising a bottom wall 39a, a lateral inner wall 39b and an inlet mouth 39c. The lateral wall 39b of the housing of the cup-shaped element 39 preferably comprises a plurality of longitudinal locking seats 45 obtained as recesses in the lateral wall 39b and in the form of portions of conical surfaces. The locking seats 45 extend between the bottom wall 39a and the inlet mouth 39c, with an inclination by an angle α with respect to the axis A and oriented in such a way that their lengthening would intersect the axis A.

The angle of inclination α corresponds to half of the total angle of the cone frustum defined by the housing of the cup-shaped element 39. Preferably, the total angle of the cone frustum is less than or equal to 30°, for example comprised between 1° and 30°. In particularly preferred embodiments, the total angle of the cone frustum is comprised between 1° and 20°, or even more preferably between 1° and 15°.

The plurality of rollers 46 is housed inside the cone-frustum housing defined by the cup-shaped element 39. Each roller 46 engages with clearance a respective longitudinal locking seat 45. The set of rollers 46 is also supported by a cage-shaped structure 47 which defines a plurality of receptacles 48. Each roller is also housed with clearance in a receptacle 48. In this way the rollers 46 are housed and retained in spaces made partly by the locking seats 45 of the cup-shaped element 39 and partly by the receptacles 48 defined by the cage-shaped structure 47.

In particular, the cage-shaped structure 47 comprises a pair of discs 47a connected by a plurality of columns 47b, wherein the columns have a cross section shaped in such a way as to define a receptacle 48 flared in a radial direction, i.e. having a sectional cross dimension variable radially and tending to narrow in the radial direction towards the axis A. In the illustrated embodiment, the plurality of columns 47b is made as a single piece with a first disc of the pair of discs 47a.

Each space defined by a locking seat 45 and a receptacle 48 is configured in such a way as to allow the relative roller 46 a limited angular displacement. In fact, when the roller 46 performs an angular displacement, it moves towards a narrowing of the seat 45 in the radial direction which in turn causes the roller to displace radially towards the axis A. However, the receptacles 48 defined by the cage 47 allow a limited radial displacement of the roller 46 having a tapering in the radial direction. This prevents a roller 46 from coming off its locking seat 45 and passing to an adjacent one, or from coming radially off the cage 47. At the same time, the radial displacement towards the axis A allows reaching the radial configuration in contact, in which the rollers 46 exert the braking action on the head portion 42.

Such, albeit limited, freedom of movement of the rollers 46 advantageously allows an easier deactivation of the brake once the rotation of the shaft 41 has been completely stopped, even in the case of the total angle of the cone frustum defined by the housing of the cup-shaped element 39 is less than 5° or the cup-shaped element 39 defines a cylindrical housing. Furthermore, the symmetrical shape of the spaces defined by the locking seats 45 and by the receptacles 48 allows to obtain the same behaviour regardless of the direction of rotation of the movement of the head portion 42 to be stopped.

The braking unit 40 further comprises a position sensor 56 (illustrated in detail in FIG. 6), preferably of the inductive type, capable of detecting the position assumed by the braking assembly 43. To this end, the cup-shaped element 39 of the braking assembly 43 has a receptacle 57 on the perimeter at which a pair of activation elements 58, for example metal inserts, are mounted. The activation elements 58 are for example supported by a block 58a configured to be fixedly housed in the receptacle 57 of the cup-shaped element 39.

Furthermore, the body 40a of the braking unit has a pair of windows 59 at which the position sensor 56 is mounted. In order to protect the braking unit 40 from the ingress of dust or humidity, the windows are advantageously sealed by means of a non-conductive material, for example IP sealing adhesives in accordance with the international standard IEC 60529.

In particular, the activation elements 58 are mounted on the cup-shaped element 39 in such a way that, when the braking assembly 43 assumes the first non-braking configuration, a first activation element of the pair of activation elements 58 comes to position itself at a first window of the pair of windows 59. Furthermore, the activation elements 58 are mounted on the cup-shaped element 39 in such a way that, when the braking assembly 43 assumes the second braking configuration, a second activation element of the pair of activation elements 58 comes to position itself at a second window of the pair of windows 59. In this way, depending on the positioning of the pair of activation elements 58, the position sensor 56 is able to detect whether the braking unit 40 is in a braking configuration or non-braking configuration.

At the second lower head 55b there is also provided a deactivation unit 60 (illustrated in detail in FIG. 7) comprising a rotatable element 61 about a rotation axis B orthogonal to the axis of the cylinder A and a deactivation pin 63, both preferably housed in corresponding seats obtained in the second lower head 55b.

The rotatable element 61 is provided with a first cam portion 62 and cooperates with the deactivation pin 63 in such a way that a rotation of the rotatable element 61 about its own axis of rotation B causes a lifting parallel to the axis A of the deactivation pin 63.

The deactivation pin 63 is positioned in the second lower head 55b in a movable manner between a rest position, in which the deactivation pin 63 is completely contained in the volume of the second lower head 55b, and an operative position, in which the deactivation pin 63 protrudes from the volume of the second lower head 55b (illustrated in FIG. 8), thus moving the second plunger 53 away from the second lower head 55b. This operation allows to deactivate the activated brake, counteracting the axial force exerted by the elastic means 44.

The deactivation unit 60 further comprises a recovery piston 64 which cooperates with a second cam portion 65 provided on the rotatable element 61. In particular, the second cam portion 65 cooperates with the recovery piston 64 in such a way that a rotation of the rotatable element 61 about its own axis of rotation B causes a lifting parallel to the axis A also of the recovery piston 64.

The recovery piston 64 is in particular positioned in the second lower head 55b in a movable manner between a retracted position with respect to the surface of the second lower head 55b facing the second sealed chamber 52, and a position flush with the second sealed chamber 52.

The recovery piston 64 is brought back to the retracted position by the action of pressurized air supplied to the second sealed chamber 52. This retraction movement of the recovery piston induces a counter-rotation of the rotatable element 61 which therefore returns to position itself in such a way as not to counteract (through the deactivation pin 63) the axial force exerted by the elastic means 44. In this way, the braking unit 40 can intervene again in order to block the rotation of the threaded shaft 41.

The operation of the activation unit 10 according to the present invention is as follows.

Pressurised fluid coming from a supply source (not illustrated) is supplied to the first pneumatic supply cylinder 20, thus causing the first plunger 22 to move inside the first sealed chamber 29.

The movement of the first plunger 22 internally of the chamber 29 causes the displacement of the stem 21 and, consequently, the oscillation of the actuating arm 13 which is controlled through the closing device 30.

In parallel, pressurised fluid is also supplied to the second pneumatic supply cylinder 50 causing the movement of the second plunger 53 inside the second sealed chamber 52.

The movement of the second plunger 53 and, consequently, of the pushers 54, counteracts the elastic thrust action exerted by the elastic means 44 in such a way that the braking assembly 43 is maintained in a position not completely close to the head 42 of the shaft 41, for example spaced by a few millimetres. In other words, a configuration in which the head portion 42 of the shaft 41 is not in a condition of maximum insertion inside the braking seat is maintained.

In particular, the pushers 54 act against a lower disc of the pair of discs 47a of the cage-shaped structure 47, which transfers the axial thrust to the cup-shaped element 39 through a second thrust bearing element 49 interposed between an upper disc of the pair of discs 47a of the cage-shaped structure 47 and the bottom wall 39a of the cup-shaped element 39.

In this condition, thanks to the engagement of the thread of the shaft 41 with the internal thread of the sleeve 25, the shaft 41 rotates freely about the axis of the cylinder A following the displacement of the first plunger 22.

In this configuration, a first activation element 58 carried by the cup-shaped element 39 is positioned at a first window 59 of the body 40a, so that the position sensor 56 detects the condition of inactive brake.

In the event of a drop or absence of supply of pressurized fluid from the supply source, the supply of pressurized fluid to the sealed chambers 29,52 is interrupted. In this condition, the second plunger 53 is no longer able to counteract the force exerted by the elastic means 44. Consequently, the braking assembly 43 is pushed in such a way that the head portion 42 of the shaft 41 penetrates inside the braking seat until it reaches the condition of maximum insertion.

In this condition, the head portion 42 begins engaging with the rollers 46 initially dragging them into rotation together with the cage-shaped structure 47. For a short angular stretch, the rollers 46 and the cage-shaped structure 47 follow the rotation imparted thanks to the friction with the head portion 42 until reaching a configuration in which the particular geometry of the angularly locked locking seats 45—since, as seen above, the cup-shaped element 39 is mounted to the body 11 of the actuation unit 10 in a manner locked against rotation—in cooperation with the receptacles 48 of the cage-shaped structure 47 prevents further angular displacement of the rollers 46.

In this condition, the rollers 46 assume a configuration of maximum radial protrusion towards the axis of the cylinder A and therefore of maximum engagement and friction with the head portion 42, thereby exerting an increased and particularly efficient braking action on the head 42. This causes a braking and subsequently a stop of the rotation of the shaft 41 and therefore the braking and the stop of the first plunger 22. In this way, the stem 21 and the actuating arm 13 are also braked and stopped.

In this configuration, a second activation element 58 carried by the cup-shaped element 39 is positioned at a second window 59 of the body 40a, so that the position sensor 56 detects the condition of active brake.

Basically, the braking unit 40 allows the displacement of the actuating arm 13 to be blocked extremely quickly and effectively in the event of absence or sudden drop of the pressure in the chamber 29 of the first pneumatically actuated cylinder for any mounting position of the actuation unit 10. The braking unit 40, thanks to its angularly symmetrical conformation, is also capable of stopping the displacement of the stem 21 in both displacement directions thereof.

Similarly, the activation of the brake can be specially controlled by piloting a pressure reduction in chamber 29.

The brake, once it is triggered, can be easily deactivated by bringing the rotatable element 61 of the deactivation unit 60 into rotation. This rotation causes a lifting of the deactivation pin 63 which cooperates with the cam portion 62, and therefore a thrust away from the second plunger 53 with respect to the second lower head 55b.

This thrust counteracts the force exerted by the elastic means 44, leading to a lifting of the cage-shaped structure 47 and, consequently, of the cup-shaped element 39 under the action of the pushers 54. The braking assembly 43 therefore disengages from the head portion 42 leaving the threaded shaft 41 free to rotate.

The invention claimed is:

1. An actuation unit comprising:
   an actuating arm movable between an open position and an operative closed position;
   a pneumatic cylinder comprising a stem movable linearly along a cylinder axis and operatively connected to the actuating arm to control the movement of the actuating arm between the open position and the operative closed position; and
   a braking unit configured to brake and/or stop the movement of the actuating arm, the braking unit comprising
   (a) a threaded shaft comprising
      a first end operatively coupled to the stem of the pneumatic cylinder in such a way that a translation of the stem determines a rotation of the threaded shaft, and
      a second end provided with a head portion comprising at least one surface portion; and
   (b) a braking assembly locked against rotation and axially movable relative to the head portion of the threaded shaft between a first non-braking configuration in which the braking assembly is not in contact with the at least one surface portion of the head portion and a second braking configuration in which the braking assembly is in contact with the at least one surface portion;
   wherein the at least one surface portion is in a non-orthogonal arrangement with respect to the cylinder axis, and the braking assembly comprises a plurality of rollers and a support structure for the rollers configured to retain each roller of the plurality of rollers allowing a clearance with respect to a radial movement of the rollers, the rollers being able to assume a first radial configuration not in contact with the at least one surface portion and a second radial configuration in contact with the at least one surface portion.

2. The actuation unit according to claim 1, wherein the at least one surface portion (a) includes a cone frustum shaped surface portion having an axis coincident to the cylinder axis and a total angle of the cone frustum less than or equal to 30'; or (b) is at least a portion of a cylindrical surface with an axis parallel to the cylinder axis.

3. The actuation unit according to claim 1, wherein the braking assembly defines a braking seat configured to at least partially be received inside the head portion, the braking seat having a shape substantially complementary to at least part of the head portion.

4. The actuation unit according to claim 3, wherein the braking seat is delimited at least in part by the plurality of rollers.

5. The actuation unit according to claim 1, wherein the support structure comprises a cup-shaped element which internally defines a housing provided with a lateral inner wall, a plurality of locking seats being obtained in the lateral inner wall, in each locking seat a respective roller of the plurality of rollers being retained with clearance with respect to an angular movement thereof.

6. The actuation unit according to claim 5, wherein the support structure for the rollers is configured to retain each roller of the plurality of rollers in the respective locking seat.

7. The actuation unit according to claim 5, wherein each locking seat of the plurality of locking seats is obtained as a recess in the lateral inner wall of the housing defined by the cup-shaped element and in the shape of a portion of a conical surface.

8. The actuation unit according to claim 5, wherein each locking seat of the plurality of locking seats extends between a bottom wall and an inlet mouth of the housing defined by the cup-shaped element along an extension direction which is tilted with respect to the cylinder axis.

9. The actuation unit according to claim 1, wherein the support structure for the rollers defines a plurality of receptacles flared in the radial direction, each roller being housed with clearance in a respective receptacle of the plurality of receptacles.

10. The actuation unit according to claim 1, wherein the support structure for the rollers comprises a pair of discs connected by a plurality of columns, wherein the columns have a cross section shaped in such a way as to define a receptacle flared in a radial direction.

11. The actuation unit according to claim 9, wherein each receptacle of the plurality of receptacles is associated with a respective locking seat of a plurality of locking seats, the plurality of locking seats being obtained in a lateral inner wall of a housing defined inside a cup-shaped element, and wherein a space defined between each receptacle and its respective locking seat is configured to house a roller with a clearance with respect to an angular and radial displacement of the roller.

12. The actuation unit according to claim 1, wherein at least one elastic element and a second pneumatically actuated cylinder act axially along the cylinder axis on the brake assembly one against the other, the at least one elastic element producing a relative approaching movement between the braking assembly and the head portion, the second pneumatically actuated cylinder producing a relative movement away between the braking assembly and the head portion.

13. The actuation unit according to claim 12, wherein the second pneumatically actuated cylinder is configured to axially move a plurality of pushers arranged in such a way as to transfer an axial thrust to the braking assembly opposed to the at least one elastic element.

14. The actuation unit according to claim 12, comprising a deactivation unit configured to transfer a manual actuation to the second pneumatically actuated cylinder.

15. The actuation unit according to claim 14, wherein the deactivation unit comprises a rotatable element about an axis of rotation orthogonal to the cylinder axis comprising a cam portion configured to cooperate with a deactivation pin, wherein the rotation of the rotatable element about its own rotation axis causes a lifting of the deactivation pin.

16. The actuation unit according to claim 15, wherein the deactivation unit comprises a recovery piston which cooperates with a second cam portion provided on the rotatable element in such a way that a rotation of the rotatable element about its own rotation axis causes a lifting parallel to the cylinder axis of the recovery piston and a movement of the recovery piston towards the rotatable element parallel to the cylinder axis causes a counter-rotation of the rotatable element such as to cause a lowering of the deactivation pin.

17. The actuation unit according to claim 1, comprising a position sensor configured to detect an instantaneous position of the braking assembly.

18. The actuation unit according to claim 5, wherein the cup-shaped element of the braking assembly comprises a receptacle on a perimeter at which at least one activation element is mounted and configured to be detected when arranged at a detection position.

19. The actuation unit according to claim 17, wherein the position sensor is mounted on a body of the braking unit adjacent at least one window sealed through a cover made of non-conductive material.

20. An actuation unit of the articulated lever or cam type comprising:
- an actuating arm pivotable between an open position and an operative closed position;
- a pneumatic cylinder comprising a stem movable linearly along a cylinder axis and operatively connected to the actuating arm to control the movement of the actuating arm between the open position and the operative closed position;
- a closing device functionally interposed between the pneumatic cylinder and the actuating arm and configured to bring the actuating arm into rotation following a translational movement imparted by the pneumatic cylinder; and
- a braking unit configured to brake and/or stop the movement of the actuating arm, the braking unit comprising
  (a) a threaded shaft comprising
    a first end operatively coupled to the stem of the pneumatic cylinder in such a way that a translation of the stem determines a rotation of the threaded shaft, and
    a second end provided with a head portion comprising at least one surface portion; and
  (b) a braking assembly locked against rotation and axially movable relative to the head portion of the threaded shaft between a first non-braking configuration in which the braking assembly is not in contact with the at least one surface portion of the head portion and a second braking configuration in which the braking assembly is in contact with the at least one surface portion;
wherein the at least one surface portion is in a non-orthogonal arrangement with respect to the cylinder axis, and the braking assembly comprises a plurality of rollers and a support structure for the rollers configured to retain each roller of the plurality of rollers allowing a clearance with respect to a radial movement of the rollers, the rollers being able to assume a first radial configuration not in contact with the at least one surface portion and a second radial configuration in contact with the at least one surface portion.

\* \* \* \* \*